Patented Oct. 28, 1952

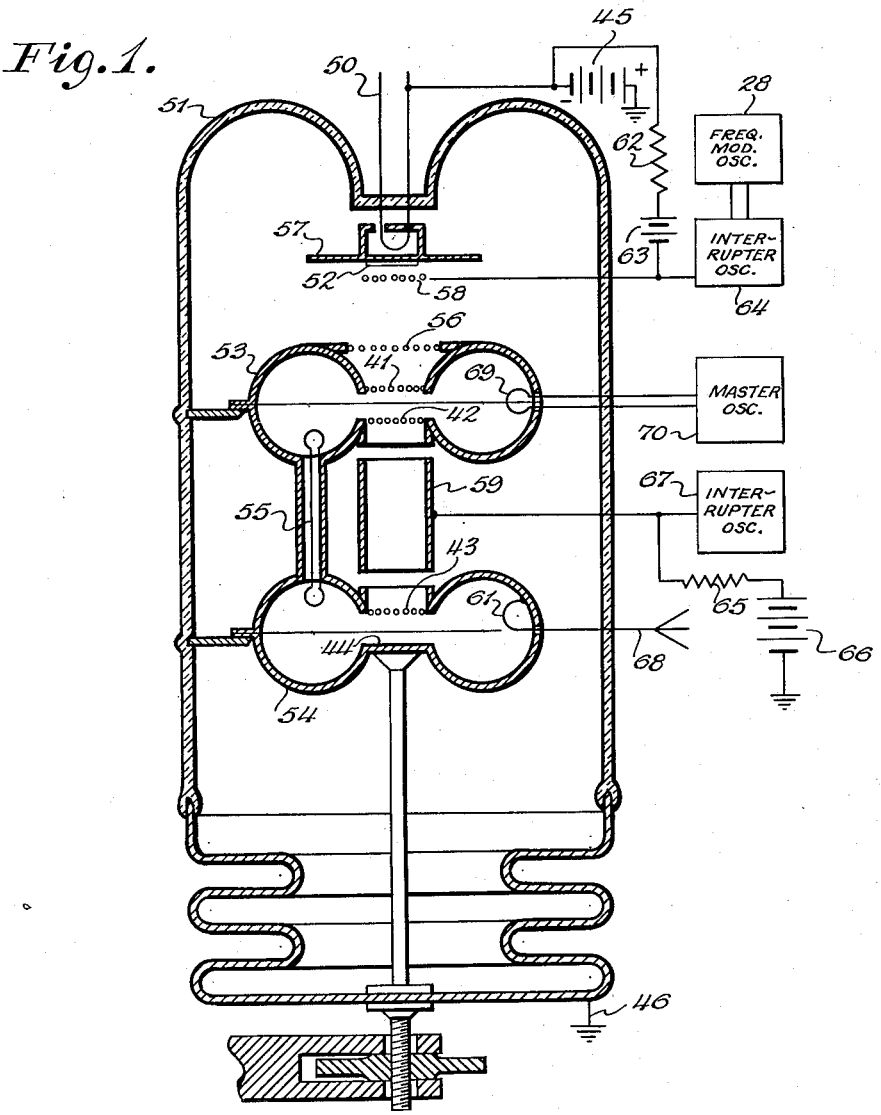

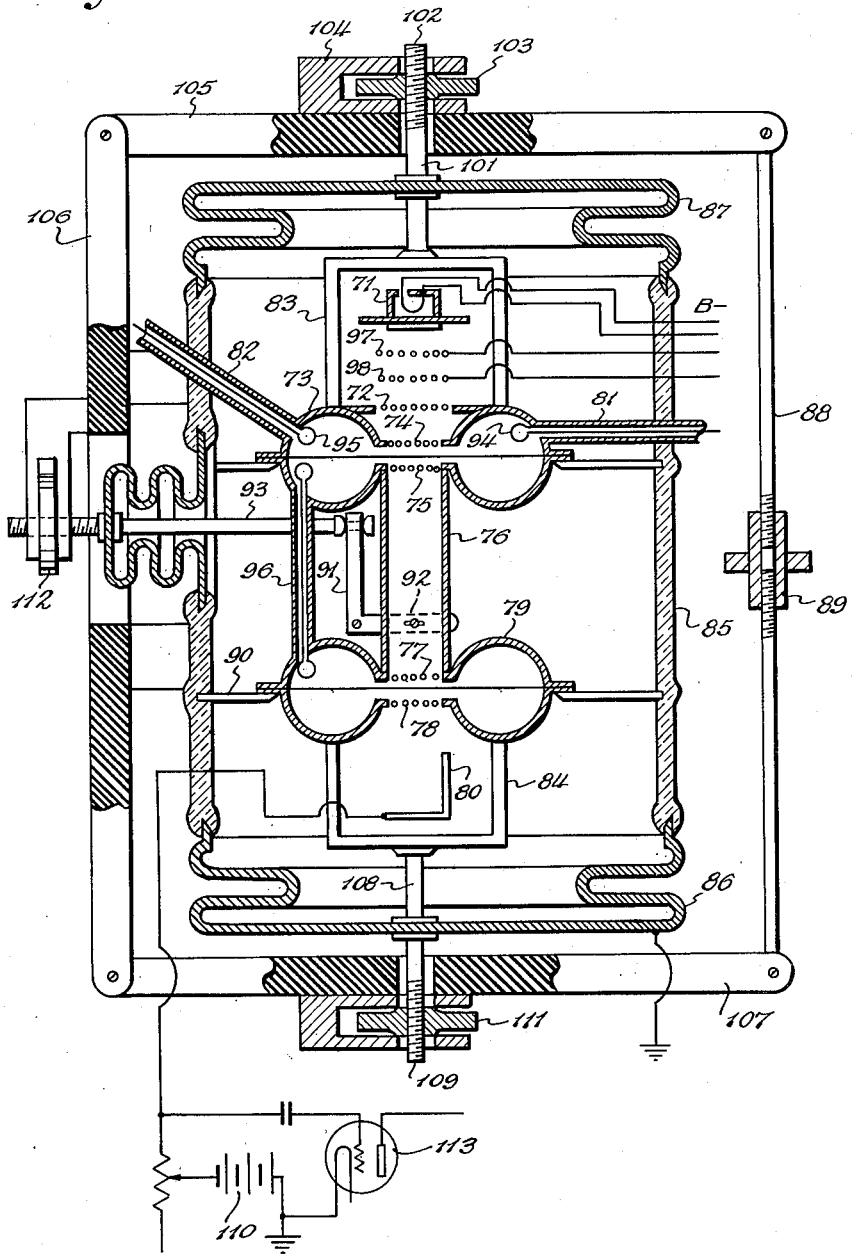

2,616,038

UNITED STATES PATENT OFFICE 2,616,038

FREQUENCY CONVERTER

William W. Hansen, Stanford University, and Russell H. Varian, Cupertino, Calif., assignors to The Board of Trustees of the Leland Stanford Junior University, Stanford University, Calif., a corporation of California Application September 19, 1942, Serial No. 459,040, which is a division of application Serial No. 185,382, January 17, 1938, now Patent No. 2,415,094, dated February 4, 1947. Divided and this application September 23, 1947, Serial No. 775,648

8 Claims. (Cl. 250—20)

The present application is a true division of our application Serial No. 459,040, now abandoned, for High Frequency Electron Discharge Tube Apparatus, filed September 19, 1942, as a division of our earlier parent Patent No. 2,415,094 for Radio Measurement of Distances and Velocities, granted February 4, 1947 on an application Serial No. 185,382 filed January 17, 1938.

In the above patent there is disclosed a system for locating aircraft or other distant objects and for measuring the distances and velocities of such objects by radio means. The present invention is concerned with apparatus adapted to operate at ultra-high frequencies and useful in the system described and claimed in the above parent application as well as in many other types of systems.

It is an object of the present invention to provide improved apparatus for the reception and detection of alternating currents of such ultra-high frequencies.

It is a still further object of the present invention to provide improved detecting apparatus for alternating currents of ultra-high frequencies.

It is still another object of the present invention to provide improved high-frequency electron discharge tube apparatus useful at these ultra-high frequencies.

Other objects and advantages of the present invention will become apparent from a consideration of the following specification and drawings, in which Fig. 1 shows a diagrammatic cross-sectional representation of one form of ultra-high-frequency apparatus suitable for generating or amplifying, and modulating alternating currents of ultra high frequency; and Fig. 2 shows a diagrammatic cross-sectional representation of an improved ultra-high-frequency apparatus useful for receiving, amplifying, detecting and otherwise modifying alternating currents of ultra-high frequency.

Referring to the drawings, Fig. 1 shows one form of modulated oscillator-amplifier suitable for use inside reflectors or with hollow resonator radiators, as disclosed in our above mentioned parent patent. The assemblage shown uses an oscillator of the kind disclosed in the co-pending patent application of R. H. Varian, Serial No. 168,355, filed October 11, 1937, for Electrical Translating System and Method, now Patent No. 2,242,275, issued May 20, 1941, with novel additions necessary in our present invention.

In Fig. 1 the electron discharge tube of the present invention is shown as comprising an evacuated container 51 within which is located an electron emitter 52 heated by a filament 50 supplied from a source of electric current (not shown). Also within container 51 is a hollow resonator 53 shown as in the form of a toroid having a pair of electron-permeable grids 41, 42 at the center thereof, whereby the resonator is adapted to confine a high-frequency alternating electromagnetic field.

A second resonator 54 is also located within the container 51 and is provided with a grid 43 and a plate 44. Resonators 53 and 54 are electrically coupled by means of a coupling 55. A collimating grid 56 is provided fixed to resonator 53 for maintaining an electric field of the desired form. All of the above structure is shown in the Patent No. 2,242,275, above referred to.

A plate 57 fixed to emitter 52 coacts with collimating grid 56 for delineating the electric field used to accelerate the electrons from emitter 52 toward grid 56 and resonators 53 and 54. For this purpose resonators 53 and 54 and grid 56 are connected to ground as at 46, and the cathode 52 is maintained at a high negative potential, as by battery 45. A grid 58 is interposed between cathode 52 and the resonator structure for controlling the electrons leaving the emitter 52. A tube 59 is located around the electron path between resonators 53 and 54 and is used for controlling the electrons in their travel between the resonators 53 and 54.

The output from the apparatus is derived from a coupling loop 61 in resonator 54 connected to a radiating element 68. An oscillator 64 is connected between grid 58 and emitter 52 by means of a coupling resistance 62 and a biasing battery 63. An oscillator 67 is similarly connected between tube 59 and emitter 52 by means of a coupling resistor 65 and a biasing battery 66. A coupling loop 69 placed within resonator 53 may be connected to a master oscillator 70 to provide excitation for the apparatus when used as a power amplifier.

In the operation of this combination, oscillations of a wavelength in the region of 1 centimeter to 20 centimeters are produced in the way explained in Patent No. 2,242,275. These oscillations are modulated or periodically interrupted by applying to grid 58 a negative potential with respect to the cathode 52 by means of battery 63 and by impressing thereon an alternating or undulating voltage generated by the oscillator 64. Modulation can also be accomplished by applying an undulating voltage to the electrode 59 with respect to the potential (ground) of the resonators by use of oscillator 67 or any other source of modulating voltage. These methods of modulation can be used either together or singly. The frequency of the interrupting potential, if oscillators 64 and/or 67 are used, is subject to the restriction that it should be low enough to permit the oscillation of the resonators to follow the interrupting frequency. We have found that if the interrupting frequency is about one thousandth that of the resonator frequency, the system will operate satisfactorily.

The arrangement shown in Fig. 1 can be used in several ways. It will act as a self-oscillator by having the two hollow resonators 53 and 54 tuned to the same frequency and exchanging energy between them through the coupling loop system 55. It will act as a power amplifier by exciting it at the frequency of the resonators 53, 54, by use of the loop 69 which receives energy from the oscillator 70. In such case feed-back connection 55 is adjusted so as to prevent self-oscillation. It will act as a frequency multiplier by using the upper resonator 53 as a buncher at one frequency and tuning the lower resonator to a harmonic of the buncher frequency. As explained in Patent No. 2,242,275, the electrons leaving resonator 53 will have variable velocities, depending upon the phase of the oscillating circuit while the electrons are passing through, so that accelerated electrons will catch up with retarded electrons, thereby changing the stream of electrons from a uniform beam to one consisting of a series of concentrations or groups or bunches of electrons which pass a given point with the same frequency as the exciting frequency of resonator 53, so that this resonator serves as a buncher of the electron stream. This action producing electron grouping as a result of the varying electron velocities and subsequent traversal of a drift space will be hereinafter termed "velocity grouping." In any of its modes of oscillation or amplification, modulation can be accomplished by the introduction of suitable modulation potentials to the grid 58 or the tube 59, or both.

Fig. 2 shows a receiving arrangement useful in the apparatus disclosed in the above-mentioned parent Patent No. 2,415,094 or in other arrangements. Here an electron emitter 71 is provided cooperating with a collimating grid 72 fixed to an electron-grouping resonator 73 having grids 74 and 75 similar to the apparatus of Fig. 1.

A second and energy-absorbing resonator 79 is provided, having grids 77 and 78, and mechanically joined to resonator 73 by means of a tube 76. A detector electrode 80, to be described, is located in the path of the electron beam issuing from the grid 78 of resonator 79 in the position of a target therefor. An incoming signal may be fed to the apparatus of the invention by means of a concentric line 81 which delivers energy to resonator 73 by means of a coupling loop 94. Energy of a heterodyning frequency may be also led to resonator 73 by means of a concentric line 82 which delivers energy to a coupling loop 95 located within resonator 73.

Resonators 73 and 79 are electrically coupled by means of a coupling line 96 in the same manner as in Fig. 1. Interposed between emitter 71 and collimating grid 72 is a grid 97 for controlling the electron stream, which may be connected to an oscillator as described in the above-mentioned parent patent, or to any other source of control potential. A further electron-controlling grid 98 may also be provided, to which may be connected a further oscillator as also described in the above-mentioned parent patent. If desired, both oscillators may be connected to one of these grids, such as 97.

For tuning or adjusting the resonant frequency of the apparatus, one wall of resonator 73 is connected by a mechanical connection 83 to a member 101 which passes through the wall of the evacuated container 85 by means of a bellows arrangement 87 permitting motion of member 101, which terminates in a screw thread 102, about which is threaded a nut 103. Nut 103 is prevented from moving longitudinally with respect to the apparatus by a bracket 104 to which is fixed an arm 105. Pivotally linked to arm 105 are further arms 88 and 106 which in turn are pivotally connected to an arm 107 cooperating with resonator 79 in the same manner as arm 105 cooperates with resonator 73. Thus, fixed to a wall of resonator 79 is a bracket 84 fastened to a member 108 similar to member 101, having a screw thread 109 thereon cooperating with a nut 111 prevented from longitudinal motion with respect to arm 107.

Tube 76 supplies mechanical support between the resonators 73 and 79 so that rotation of nut 111, for example, will cause a compression of the walls of resonator 79, thereby producing a tuning adjustment of this resonator, as described in Patent No. 2,242,275. Similarly, rotation of nut 103 will produce a tuning of resonator 73.

Simultaneous tuning of both resonators 73 and 79 may be produced by means of a turn-buckle arrangement 89 which, by means of the pivoted arms already described, will simultaneously adjust resonators 73 and 79.

For producing a differential tuning of the two resonators, tube 76 is provided with a slot in which slides a pin 92 fixed to a lever 91, which is actuated externally by means of an arm 93 and a thread and nut arrangement 112 similar to those already described. In this manner, by rotation of the nut of arrangement 112, tube 76 is translated up or down and thereby increases the resonant frequency of one of the resonators 73, 79, while decreasing that of the other.

The operation of the receiver shown in Fig. 2 is somewhat similar to that of a vacuum tube circuit with two tuned circuits. The two resonators are tuned to about the same frequency. An input signal to which resonator 73 is tuned is introduced through the line 81 to the coupling loop 94. This causes the resonator 73 to contain a weak electromagnetic field which acts upon the stream of electrons from the emitter 71 as they proceed through the resonator from grid 74 to grid 75 after being accelerated by the field between the emitter 71 and collimating grid 72 produced by a battery such as 45 in Fig. 1. In addition to the incoming signal at 94, the resonator 73 receives a signal through loop 95 of nearly the same frequency for heterodyning with the input signal. This heterodyning signal combines with the input signal to establish the oscillating electromagnetic field in member 73 that acts on the electron stream to cause the same to become bunched, as described in the Varian Patent No. 2,242,275, as it travels toward the grids 77 and 78 of the oscillating resonator 79. The resonator 79 oscillates with varying intensity analogously to the plate circuit of an ordinary heterodyne detector as the phase between the signals of loops 94 and 95 shifts, and accordingly it causes the velocity of the electrons emerging from the field between grids 77 and 78 to vary recurrently at the beat frequency. The electrode 80 is adjusted to a negative potential by battery 110 so that some of the electrons in the stream are deflected away from it while others hit it, depending upon their velocities. Two adjustments are possible, one so that almost none of the electrons of normal velocity (i. e., those passing through when neither the input nor heterodyne signals are supplied) strike the electrode, and the other so that nearly all the electrons of normal velocity strike it. In either adjustment, when a signal is added there will be electrons approaching the electrode with velocities both greater and less than the velocities without the signal. In the first adjustment those electrons of velocities greater than before will hit the electrode so that the current from electrode 80 will increase. In the second adjustment all the electrons of lowered velocity will miss the electrode while those of increased velocity will continue to hit, so the current from electrode 80 will decrease. In either case, the average current from electrode 80 will be a function of the strength of oscillation in resonator 79, as is required for signal detection. The coupling loop 96 between resonators 73 and 79 can be adjusted for such amounts of regeneration between the two circuits as may be desired. The output from electrode 80, being of frequencies in the ordinary ranges, can be amplified in ordinary vacuum tube circuits, as indicated at 113. The two grids 97 and 98 are used for modulating or interrupting the output of the detector.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for detecting electromagnetic waves comprising a cavity resonator having opposed electron permeable walls, said resonator having at least one reentrant wall portion, means for producing a beam of electrons directed through said resonator, means for introducing said waves into said resonator to excite a field therein to change the velocities of electrons in the said beam and means for translating the variation of electron velocities into a detected signal corresponding to the said waves.

2. The invention as set forth in claim 1, wherein said means for translating the variation of electron velocities into a detected signal comprises means for segregating the electrons of said stream into groups according to their velocities, and means for indicating the relative number of electrons in said groups, thereby effecting detection of the signal.

3. The invention set forth in claim 2, wherein said means for segregating the electrons of said stream into groups according to their velocities comprises an electrode having one surface of substantial extent along the direction of motion of the electrons of said stream, and means for maintaining said electrode at a negative average potential with respect to said resonator.

4. An electromagnetic receiver comprising first and second electron permeable cavity resonators, means for adjusting the frequency of each of said resonators individually and the pair differentially, means for introducing a radio signal into said first one of said cavity resonators to act on a stream of electrons passing therethrough and produce grouping in the electron stream, means for directing the electron stream through said second resonator to excite said second resonator and to be influenced thereby with consequent variations of velocity of the electrons, and means for utilizing the electrons with their variations in velocity for signal detection.

5. A heterodyne receiver for ultra high frequency signals, comprising a cavity resonator having electron permeable walls, means for producing an electron beam and directing said beam through said walls in succession, means for energizing said resonator by said signals and by a local oscillator wave to produce variations in the velocity of the electrons in said beam, and mean for detecting said velocity-varied electron beam.

6. A heterodyne receiver for receiving an ultra high frequency signal, comprising means for producing an electron beam, a cavity resonator having electron permeable walls and adapted to contain a standing electromagnetic field, means for energizing said resonator by said signal and by a local oscillation wave of a frequency differing slightly from said signal, means for directing said electron beam through said resonator walls to produce variations in the velocity of the electrons of said beam, and means for detecting said velocity-varied electron beam.

7. A heterodyne receiver as defined in claim 6, wherein said means for detecting said velocity-varied electron beam comprises an electron beam target electrode positioned beyond said resonator from said electron stream producing means, and means negatively biasing said target electrode relative to said resonator for selectively receiving electrons accelerated by said resonator by joint action of said signal and said local oscillation wave and repelling the slow electrons of said beam.

8. A heterodyne receiver as defined in claim 7, further including a second resonator interposed between said target electrode and the aforesaid resonator and responsive to the velocity-varied electron beam.

WILLIAM W. HANSEN.
RUSSELL H. VARIAN.

REFERENCES CITED

The following references are of record in the file of this patent:

UNITED STATES PATENTS

| Number | Name | Date |
|---|---|---|
| 1,650,232 | Pickard | Nov. 22, 1927 |
| 1,896,780 | Llewellyn | Feb. 7, 1933 |
| 1,988,621 | Hansell | Jan. 22, 1935 |
| 2,038,341 | Bruche | Apr. 21, 1936 |
| 2,094,606 | Knoll | Oct. 5, 1937 |
| 2,100,701 | Schlesinger | Nov. 30, 1937 |
| 2,110,911 | Knoll | Mar. 15, 1938 |
| 2,125,418 | Benjamin | Aug. 2, 1938 |
| 2,180,958 | Hollman | Nov. 21, 1939 |
| 2,181,170 | Brown | Nov. 28, 1939 |
| 2,190,668 | Llewellyn | Feb. 20, 1940 |
| 2,195,456 | Hollmann | Apr. 2, 1940 |
| 2,220,839 | Hahn | Nov. 5, 1940 |
| 2,242,275 | Varian | May, 20, 1941 |
| 2,293,151 | Linder | Aug. 18, 1942 |
| 2,408,420 | Ginzton | Oct. 1, 1946 |
| 2,408,895 | Turner | Oct. 8, 1946 |